United States Patent [19]

Holm et al.

[11] Patent Number: 4,921,178

[45] Date of Patent: May 1, 1990

[54] MACHINE FOR WINDING A ROTOR FOR A ROTATING ELECTRICAL MACHINE

[75] Inventors: Roland Holm, Utterstigen; Josef E. Enhardt, Hundhamravägen, both of Sweden

[73] Assignee: Garphyttan Industrier AB, Norsborg, Sweden

[21] Appl. No.: 340,630

[22] PCT Filed: Oct. 6, 1987

[86] PCT No.: PCT/SE87/00449

§ 371 Date: Apr. 4, 1989

§ 102(e) Date: Apr. 4, 1989

[87] PCT Pub. No.: WO88/02570

PCT Pub. Date: Apr. 7, 1988

[30] Foreign Application Priority Data

Oct. 6, 1986 [SE] Sweden .................. 8604226

[51] Int. Cl.$^5$ .................. H02K 15/09; H02K 15/02
[52] U.S. Cl. .................. 242/7.05 R; 242/7.11; 29/598; 29/736
[58] Field of Search ............ 242/7.11, 7.14, 70.5 R, 242/70.5 A, 7.05 C; 29/736, 598, 605

[56] References Cited

U.S. PATENT DOCUMENTS 2,561,562 7/1951 Collins .................. 242/7.05 C
2,883,119 4/1959 Braun .................. 242/7.05 R
3,163,921 1/1965 Applegate .................. 242/7.05 R X

FOREIGN PATENT DOCUMENTS 1173179 7/1964 Fed. Rep. of Germany .
1204739 11/1965 Fed. Rep. of Germany .
862483 3/1961 United Kingdom .
872079 7/1961 United Kingdom .

Primary Examiner—Stuart S. Levy
Assistant Examiner—William G. Battista, Jr.
Attorney, Agent, or Firm—Browdy and Neimark

[57] ABSTRACT

A machine for winding a rotor core for a rotating electrical machine, the rotor core having axially extending winding slots and to be provided with a winding comprising a number of coils corresponding to the number of winding slots, includes two mutually similar winding devices (2, 3) arranged coaxially opposite another. The winding devices can be brought together and moved apart in the axial direction and each device includes a wire guide ring (16) having an inner diameter larger than the outer diameter of the rotor core (13) and provided in its surface thereof facing the other winding device with radially extending wire guide grooves (17) corresponding to the winding slots of the rotor core. The inner surface of the ring (16) has provided thereon, opposite each guide groove (17), a radially and inwardly projecting lug (18) with radial extension exceeding the clearance between the inner surface of the ring (16) and the outer surface of the rotor core (13). Each winding device (2, 3) also includes a rotor guide sleeve (19) arranged co-axially in relation to the wire guide ring (16) and rotatable, but not axially movable, in relation to the wire guide ring (16). The rotor guide sleeve (19) has a cylindrical inner surface having a diameter slightly exceeding the outer diameter of the rotor core (13) and provided with axially extending ribs (22) which correspond to and can engage the winding slots on the rotor core.

7 Claims, 3 Drawing Sheets

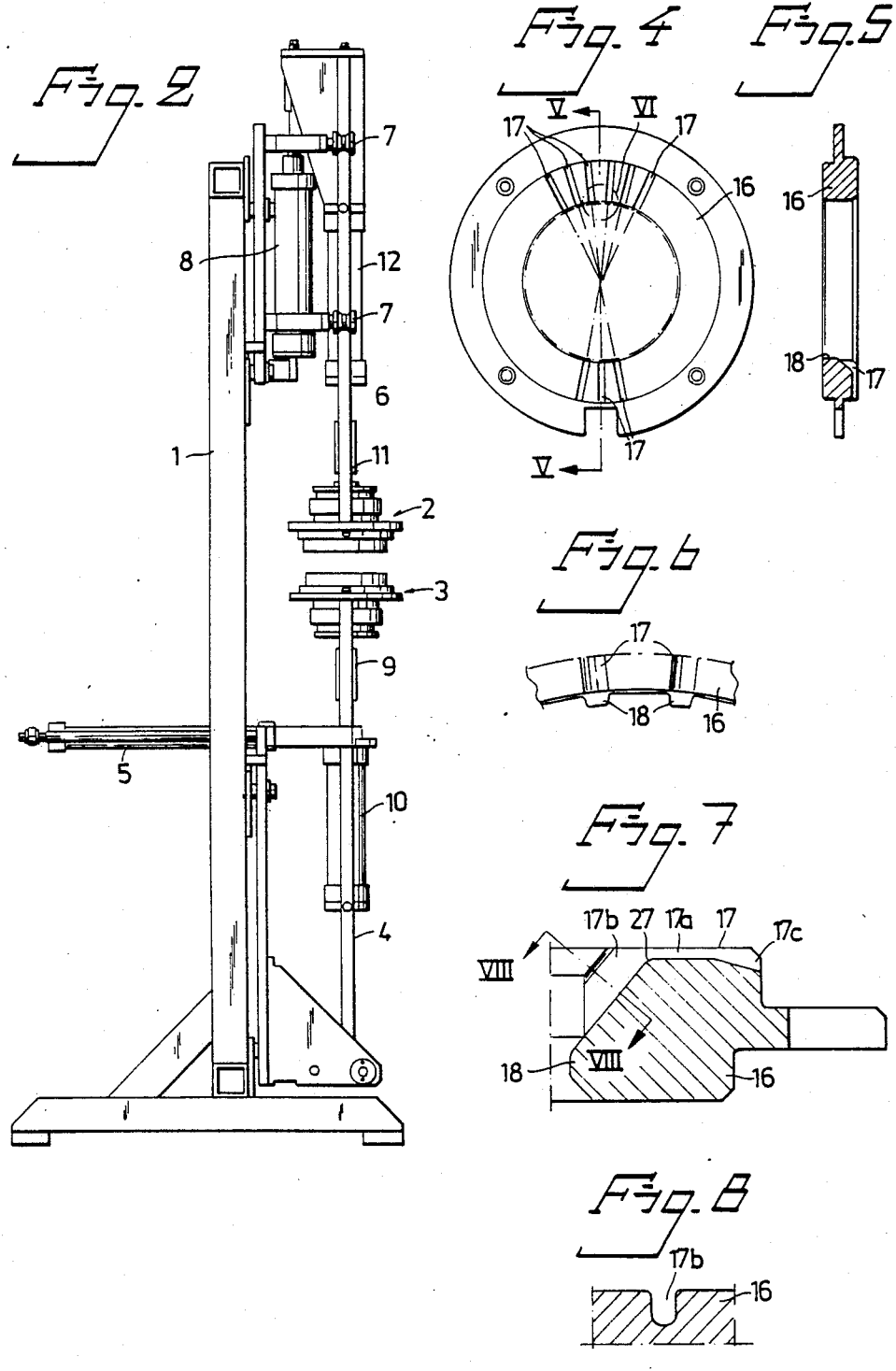

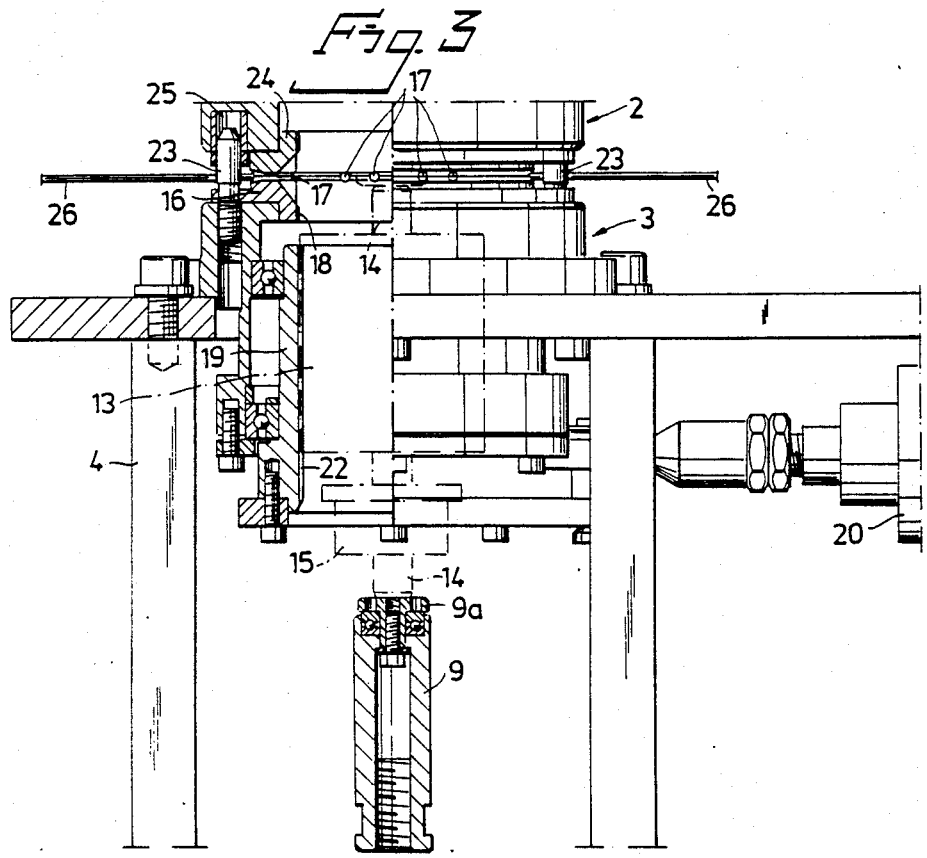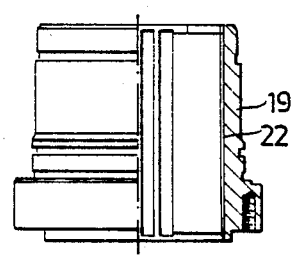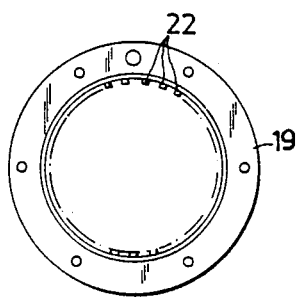

MACHINE FOR WINDING A ROTOR FOR A ROTATING ELECTRICAL MACHINE

The present invention relates to a machine of the kind set forth in the preamble of claim 1 and intended for winding a rotor for a rotating electrical machine.

The Swedish Patent Specifications 191 365 and 191 366 teach such a machine and also a method for winding a rotor for a rotating electrical machine. The rotor comprises a cylindrical rotor core which has provided circumferentially around the outer peripheral surface thereof a plurality of axially extending and uniformly spaced winding slots, and which shall be provided with a winding that comprises the same number of coils as there are slots each of these coils being placed into two mutually different winding slots. The machine and methods described in these patent specifications, however, cannot be readily applied when wishing to wind rotors which have an odd number of winding slots. Furthermore, the known machine can only be used for winding relatively thin wire that has a diameter smaller than ca 0.5 mm. This known machine has a relatively complicated construction and the use of the machine is also highly complicated and time consuming.

The object of the present invention is to provide an improved winding machine of the aforesaid kind which can be used to wind rotors having an even number of winding slots as well as rotors having an odd number of winding grooves, and which can also be used to wind higher gauge wires, e.g. wires having a diameter of up to at least ca 5 mm. A further object is to provide such a winding machine which is of simple construction, which can be used easily and with which a rotor can be wound in a much shorter time than was previously possible.

These objects are achieved with a rotor winding machine of the aforesaid kind that has the characteristic features set forth in the following claims.

The invention will now be described in more detail with reference to an exemplifying embodiment of the inventive winding machine and with reference to the accompanying schematic drawings, in which FIG. 1 is a front view of the machine;

FIG. 2 is a side view of the machine;

FIG. 3 is a front view, partly in axial section, of a part of the machine in larger scale;

FIG. 4 is a plan view of a wire guide ring forming part of the machine;

FIG. 5 is a sectional view of the guide ring shown in FIG. 4, taken on the line V—V in said Figure;

FIG. 6 is a part view in larger scale, illustrating that part of the guide ring which lies in the chain-circle VI in FIG. 4;

FIG. 7 is an enlarged sectional view of the guide ring illustrated in FIG. 4;

FIG. 8 is a sectional view taken on line VIII—VIII in FIG. 7;

FIG. 9 is a side view, partly in axial section, of a guide sleeve forming part of the machine; and FIG. 10 is an end view of the guide sleeve illustrated in FIG. 9.

Figure 1:
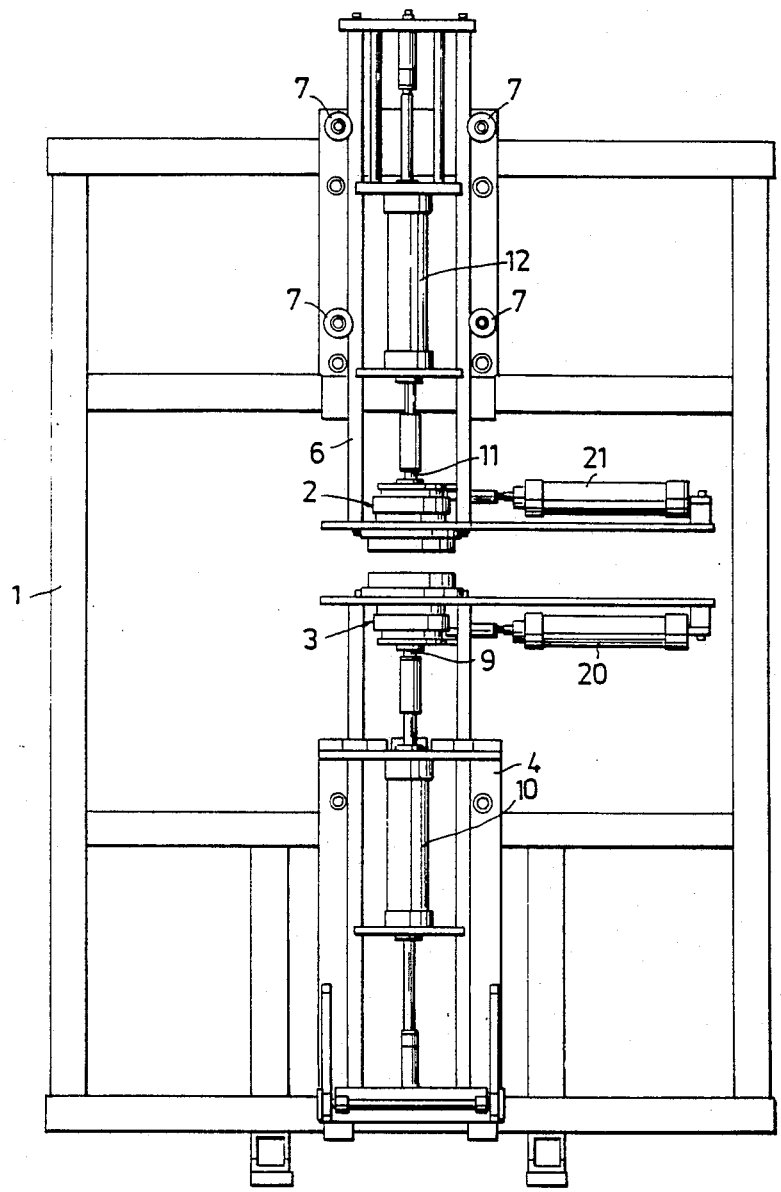

As will be seen from FIGS. 1 and 2, the illustrated exemplifying embodiment of a machine constructed in accordance with the invention includes a stand, generally referenced 1, in which two winding devices, generally referenced 2 and 3 respectively, are mounted. The two winding devices 2, 3 are mutually identical and are placed in mirror-image symmetry, co-axially opposite one another. The lower winding device 3 is carried by a frame 4 which is hinged at its lower end to the stand 1, such as to enable the frame to be swung between the vertical position illustrated in FIGS. 1, 2 and a position in which the frame is slightly inclined to the right in FIG. 2, by means of a piston-cylinder device 5. The upper winding device is mounted in an associated frame 6 which can be moved vertically between the raised position illustrated in FIGS. 1, 2 and a lowered position in which the bottom surface of the upper winding device 2 lies against the upper surface of the lower winding device 3, this vertical movement of the upper frame being effected with the aid of guides and rollers 7 and a further piston-cylinder device 8. The lower frame 4 also carries a shaft headstock or support means 9 (see also FIG. 3) which has a rotatable end 9a and which can be moved axially by means of a hydraulic piston-cylinder device 10 carried by the frame 4. Correspondingly, the upper frame 6 carries a similar shaft headstock or support means 11 which can be moved axially by means of a hydraulic piston-cylinder device 12 carried by the frame 6, said headstocks 9 and 11 being placed opposite to and in line with one another. The headstocks 9, 11 are intended to hold firmly therebetween the shaft of a rotor which is to be wound by the machine, as illustrated schematically in FIG. 3, which shows in chain lines a rotor located in its winding position. The illustrated rotor includes a rotor core 13 which has provided on its outer peripheral surface in a conventional manner a plurality of axially extending winding slots, and is mounted on a rotor shaft 14 which has fitted to one end thereof the collector 15 of the rotor. The rotor gripped between the mutually opposing headstocks 9 and 11 can be moved vertically, backwards and forwards, by means of the hydraulic piston-cylinder devices 10 and 12. The rotatable end 9a of the headstock 9 and a correspondingly rotatable end of the headstock 11 enable the rotor to be rotated relative to the headstocks 9 and 11.

As beforementioned, the two winding devices 2 and 3 are identical to one another, and hence only the lower winding device 3 will be described in detail in the following description. The lower winding device 3 is shown in detail and partially in axial section in FIG. 3, whereas the more essential components of the device are illustrated in FIGS. 4–10.

The lower winding device 3 includes a wire guide ring 16 which is firmly mounted on the associated frame 4, and a rotor guide sleeve 19 which is arranged co-axially in relation to the wire guide ring 16 on the side of the ring remote from the upper winding device 2 and which is rotatable in relation to the guide ring 16 but immovable in the axial direction.

The wire guide ring 16 is illustrated in more detail in FIGS. 4–8. The inner diameter of the ring 16 is slightly greater than the outer diameter of the rotor core 13 to be wound and the upper surface of the ring facing the upper winding device 2 has provided thereon a plurality of radially extending wire guide grooves 17. The grooves 17 are distributed uniformly around the circumference of the ring 16, and the number of grooves provided coincides with the number of winding slots on the rotor core 13 to be wound, i.e. also with the number of coils in the rotor winding to be produced. As will be seen more clearly from FIGS. 7 and 8, each of the wire guide grooves 17 has a center part 17a, a part 17b which is located nearest the inner surface of the ring, and a part 17c which is located nearest the outer periphery of the ring. The groove bottom in the centre part 17a of the groove extends substantially parallel with the plane of the ring, i.e. at right angles to the ring axis, and the centre part 17a of the groove has a semi-circular cross-sectional shape, with a radius which only slightly exceeds the radius of the winding wire to be used. It will be seen that the wire guide groove 17 together with the corresponding wire guide groove in the other wire guide ring of the upper winding device 2 forms a closed wire guide channel when the two winding devices 2, 3 are brought together such that the two mutually opposing surfaces of respective wire guide rings abut one another. Thus, with the rings in this position the wire will be guided accurately and "firmly" in the centre part 17a of respective wire guide grooves. The inner part 17b of the wire guide groove has a bottom surface which is inclined relative to the plane of the ring 16 and away from the upper side of the ring 16, thereby forming a mouth portion, such that the groove 17 becomes progressively deeper in a direction towards the inside of the ring 16. The inside of the ring 16 has provided thereon a radially and inwardly projecting lug 18 at a location centrally of each wire guide groove 17. This lug has a radial extension inwardly of the inner surface of the ring 16 which exceeds the clearance or play between the inner surface of the ring 16 and the cylindrical outer surface of the rotor core 13 to be wound. The rotor guide sleeve 19 mounted in the lower winding device 3 is illustrated in FIG. 3 and in FIGS. 9 and 10. As beforementioned, the rotor guide sleeve 19 is rotatable relative to the wire guide ring 16 but axially immovable relative thereto. The sleeve 19 can be rotated about its axis relative to the ring 16 by means of a hydraulic piston-cylinder device 20 (see FIG. 1). A corresponding piston-cylinder device for rotating the rotor guide sleeve of the upper winding device 2 about is axis is referenced 21 in FIG. 1. The rotor guide sleeve 19 has a cylindrical inner surface having a diameter which slightly exceeds the outer diameter of rotor core 13 to be wound. As will be seen more clearly from FIGS. 9 and 10, the cylindrical inner surface of the sleeve 19 is also provided with a plurality of axially extending ribs 22, the number of ribs provided corresponding to the number of winding slots in the rotor core 13. The radial extension of the ribs 22 is such that the ribs will project slightly into the winding slots of a rotor core 13 located within the sleeve 19 in the manner illustrated in FIG. 3. Thus, by rotating the rotor guide sleeve 19 by means of the hydraulic piston-cylinder device 20 it is possible to rotate the rotor core 13 about is axis relative to the stationary wire guide ring 16 when the rotor core 13 is located in the position illustrated in FIG. 3. If the rotor core 13 is located in the corresponding rotor guide sleeve of the upper winding device 2, the rotor core can be rotated relative to the stationary wire guide rings in a corresponding manner, by means of the hydraulic piston-cylinder device 21.

As beforementioned, the upper winding device 2 is structurally identical to the aforedescribed lower winding device 3. The only essential difference between the two devices is that the wire guide ring 16 of the lower winding device 3 is provided with a plurality of guide pins 23 (see FIG. 3), whereas the wire guide ring 24 of the upper winding device 2 is provided with a plurality of guide holes 25 corresponding to the guide pins 23.

Winding of a rotor by means of the aforedescribed inventive machine is effected in the following manner:

The rotor, complete with the exception of the winding, i.e. a rotor comprising the rotor core 13, the rotor shaft 14 and the collector 15, is first provided with a winding wire for each coil to be incorporated in the winding, i.e. for each winding slot located in the outer cylindrical surface of the core 13. Each such wire has a length which corresponds to the total wire length of a coil and one end of the wire is bent to a suitable shape and fastened directly to an associated part of the rotor collector 15. The wire part located nearest the bent end of the wire is then placed into an associated winding slot of the core 13, with the remaining straight part of the wire protruding axially from the opposite end surface of the rotor core. Subsequent to placing a winding wire in each winding slot of the rotor core 13, the rotor is placed in the inventive winding machine.

When placing the rotor in the winding machine, the lower frame 4 carrying the lower winding device 3 is swung to the aforementioned slightly inclined position, by means of the hydraulic piston-cylinder device 5, with the upper frame 6 carrying the upper winding device 2 occupying the slightly raised position illustrated in FIGS. 1 and 2. With the lower frame 4 and the lower winding device 3 in their said inclined position, the rotor is inserted into the lower winding device 3 to the position illustrated in FIG. 3, in which the rotor core 13 is located fully within the rotor guide sleeve 19 with the ribs 22 on the inner surface of the sleeve 12 projecting slightly into the winding slots of the rotor core 13. The axially projecting winding wires protruding from the upper end surface of the rotor core 13, these wires being referenced 26 in FIG. 3, are then bent outwards and placed in respective wire guide grooves 17 in the wire guide ring 16 of the lower winding device 3.

The lower frame 4 carrying the lower winding device 3 is then swung to its vertical position illustrated in FIGS. 1, 2, whereafter the upper frame 6 carrying the upper winding device 2 is lowered, by means of the hydraulic pistoncylinder device 8, to a position in which the device is united with the lower winding device 3, in which position the wire guide rings 24 and 16 of respective winding devices 2, 3 lie in abutment with one another, with a winding wire 26 enclosed in each of the wire guide channels formed by the wire guide grooves 17.

The hydraulic piston-cylinder device 20 is then actuated to rotate the rotor guide sleeve 19 of the lower winding device 3, thereby rotating the entire rotor in relation to the stationary wire guide rings 16, 24, through an angle corresponding to the desired coil step. As a result, the winding wires 26 guided in the channels 17 defined by the stationary wire guide rings 16, 24 are brought to positions opposite other winding slots in the rotor core 13.

The hydraulic piston-cylinder devices 10 and 12 are then activated to move the rotor held between the headstocks 9 and 11 vertically upwards through the stationary wire guide rings 16, 24, until the rotor core 13 is located fully within the rotor guide sleeve of the upper winding device 2. During this vertical displacement of the rotor, the rotor core 13 is guided effectively by the rotor guide sleeves 19 in the two winding devices 2, 3, and by the ribs 22 provided on the inner surface of the rotor guide sleeves 19. It will be seen that during this vertical displacement of the rotor, the winding wires 26 are brought into the winding slots intended for the wires in the rotor core 13. This is effected during the upward movement of the rotor with the aid of the wire guide ring 24 in the upper winding device 2. As a winding wire is placed in a slot with the aid of a wire guide ring, the wire is bent in two steps, i.e. firstly at the bend point 27 (see FIG. 7) located between the two parts 17a and 17b of the wire guide groove, and secondly at the bend point formed by the lug 18 projecting into the winding slot on the core 13. Because the winding wire is accurately and "firmly" guided in the groove part 17a, the wire is bent during drawing of the wire, so that the wire is plastically deformed and is placed rectilinearly, in the absence of residual spring tension, into the winding slot of the rotor core 13. The lug 18 projecting into the winding slot co-operates herewith in moving the wire positively and reliably into the winding slot.

The rotor guide sleeve of the upper winding device 2 is then rotated by means of the piston-cylinder device 21 through an angle corresponding to the coil step used, whereafter the rotor is moved axially downwards, with the aid of piston-cylinder devices 10 and 12 to the rotor guide sleeve 19 in the lower winding device 3, such that a further coil-section side in each coil section is placed into the winding slot of the rotor core 13.

These procedural steps are repeated for the number of times taken to place each coil, i.e. each winding wire 26, into the winding slot of the rotor core 13 with the desired number of turns.

When the last coil sides are being place uppermost in the winding slots of the rotor core 13, the lugs 18 on the wire guide ring protruding into the winding slots co-operate in pressing the wires together and urging the same down into respective slots, so as to provide an extremely compact winding with a high copper-fill factor.

Upon completing a winding operation in the machine, the upper frame 6 carrying the upper winding device 2 is raised to the raised position illustrated in FIGS. 1, 2, and the lower frame 4 carrying the lower winding device 3 is moved out to its inclined position, so that the rotor can be removed from the machine. All that then remains is to connect the free ends of the wires 26 to the intended parts of the collector 15 of the rotor.

Thus, a winding machine constructed in accordance with the invention enables a rotor to be provided with the winding desired in a very simple manner and in a very short period of time. It will be understood that a machine constructed in accordance with the invention can be readily modified for winding rotors of mutually different sizes and/or rotors comprising different numbers of winding slots, by exchanging the winding devices 2, 3.

It will also be understood that the structural design of a machine according to the invention can be varied within wide limits. For example, the various hydraulic piston-cylinder devices can be replaced with pneumatic piston-cylinder devices or other suitable drive means.

We claim:

1. A machine for winding a rotor for a rotating electrical machine, the rotor comprising a cylindrical rotor core (13) which has a plurality of substantially axially extending winding slots provided on its cylindrical outer surface and which is to be provided with a winding comprising a given number of coils, each coil being located in at least two mutually different winding slots, said machine comprising holding devices (9, 11, 19) for firmly holding the rotor, and an annular wire guide means (16, 24) which is arranged co-axially in relation to the rotor axis and said wire guide means having an inner diameter of which is greater than the outer diameter of the rotor core (13) and which is provided with a number of wire guide channels corresponding to the number of coils in the winding, and further comprising means (10, 12, 20, 21) for axially displacing and peripherally rotating the rotor holding means and the wire guide means in relation to one another, characterized in that the wire guide means comprises two rings (16, 24) which are substantially mirror-images of one another and which are arranged in a manner such that the rings can be brought together and moved apart, and which rings have an inner diameter which is slightly greater than the outer diameter of the rotor core (13), and in that the mutually facing surfaces of the rings (16, 24) which abut one another when the rings are brought together have provided thereon a number of wire guide grooves (17) which extend radially between the outer and inner edges of respective rings and the number of which grooves corresponds to the number of coils each wire guide groove having a mouth portion for receiving a winding; and in that the inner peripheral surface of the ring (16, 24) has provided thereon a radially inwardly projecting lug (18) at the mouth of each wire guide groove (17), said lug having a radial extension which exceeds the play or clearance between the inner surface of the ring (16, 24) and the outer surface of the rotor core (13).

2. A machine according to claim 1, characterized in that the depth of the wire guide groove (17) increases in a direction towards the inner surface of the ring (16, 24).

3. A machine according to claim 2, characterized in that the bottom of the wire guide groove (17) has a bottom portion located within a center part (17a) of said groove which extends substantially parallel with the plane of the ring (16), whereas the groove bottom in a part (17b) of the groove located nearest the inner surface of the ring (16) and adjoining said center part (17a) is inclined relative to the plane of the ring.

4. A machine according to claim 3, characterized in that said center groove part (17a) is dimensioned for frictional abutment with the wire (26) guided therein.

5. A machine according to claim 4, characterized in that said rotor holding means comprises two mutually coaxial shaft headstocks or supports (9, 11) which are intended to abut the ends of a rotor shaft such as to firmly hold the rotor therebetween; and in that the headstocks (9, 11) are connected to means (10, 12) for moving said headstocks and a rotor clamped therebetween axially backwards and forwards in relation to the annular, stationary wire guide means (16, 24).

6. A machine according to claim 1, characterized in that to each of said rings (16, 24) is connected for rotation, but not axial movement, a sleeve-like element (19) arranged co-axially relative to the ring on the side thereof remote from the other ring; in that the sleeve-like element (19) has a cylindrical inner surface and an inner diameter which is somewhat greater than the outer diameter of the rotor core (13) and a number of axially extending ribs (22) which are intended to engage in the winding slots provided in the outer peripheral surface of the rotor core (13), and in that the sleeve-like element (19) is connected to means (20, 21) for rotating said element relative to the stationary ring (16, 24).

7. A machine according to claim 6, characterized in that the number of ribs (22) provided on the sleeve-like element (19) coincides with the number of winding slots provided on the rotor core (13).

* * * * *